(12) United States Patent
Yadav et al.

(10) Patent No.: US 11,302,917 B2
(45) Date of Patent: Apr. 12, 2022

(54) PROCESS FOR MAKING MANGANESE DIOXIDE AND ITS POLYMORPHS REVERSIBLE

(71) Applicant: RESEARCH FOUNDATION OF THE CITY UNIVERSITY OF NEW YORK, New York, NY (US)

(72) Inventors: Gautam G. Yadav, New York, NY (US); Xia Wei, New York, NY (US); Michael Nyce, New York, NY (US); Sanjoy Banerjee, New York, NY (US)

(73) Assignee: Research Foundation of City University of New York

( * ) Notice: Subject to any disclaimer, the term of this patent is extended or adjusted under 35 U.S.C. 154(b) by 2 days.

(21) Appl. No.: 16/634,054

(22) PCT Filed: Jul. 27, 2018

(86) PCT No.: PCT/US2018/044040
§ 371 (c)(1),
(2) Date: Jan. 24, 2020

(87) PCT Pub. No.: WO2019/023546
PCT Pub. Date: Jan. 31, 2019

(65) Prior Publication Data
US 2020/0227739 A1 Jul. 16, 2020

Related U.S. Application Data
(60) Provisional application No. 62/538,194, filed on Jul. 28, 2017.

(51) Int. Cl.
*H01M 4/00* (2006.01)
*H01M 4/50* (2010.01)
(Continued)

(52) U.S. Cl.
CPC ........... *H01M 4/50* (2013.01); *H01M 4/0438* (2013.01); *H01M 4/625* (2013.01); *H01M 4/626* (2013.01);
(Continued)

(58) Field of Classification Search
CPC .... H01M 10/25; H01M 4/26; H01M 10/4235; H01M 6/04; H01M 4/50; H01M 4/04; H01M 4/08
See application file for complete search history.

(56) References Cited

U.S. PATENT DOCUMENTS
2015/0311503 A1* 10/2015 Ingale .................. H02J 7/0068
320/130

FOREIGN PATENT DOCUMENTS
JP 2007080614 A 3/2007
KR 19990070917 A 9/1999
(Continued)

OTHER PUBLICATIONS
International Preliminary Report on Patentability dated Feb. 6, 2020, for International Application No. PCT/US2018/044040, filed on Jul. 27, 2018.
(Continued)

*Primary Examiner* — Cynthia H Kelly
*Assistant Examiner* — Monique M Wills
(74) *Attorney, Agent, or Firm* — Andrew M. Metrailer; Conley Rose, P.C.

(57) ABSTRACT

A method of forming a layered manganese dioxide for use in a cathode of a battery comprises disposing a cathode into a housing of an electrochemical cell, disposing an anode into the housing, disposing a polymeric separator between the anode and the cathode such that the anode and the cathode are electrically separated, adding an alkaline electrolyte to the housing, cycling the electrochemical cell into the $2^{nd}$ (Continued)

electron capacity of the manganese dioxide, and forming a layered manganese dioxide having a layered manganese dioxide structure with the one or more additives incorporated into the layered manganese dioxide structure. The cathode comprising a cathode material comprising: a manganese dioxide compound, one or more additives selected from the group consisting of bismuth, copper, tin, lead, silver, cobalt, nickel, magnesium, aluminum, potassium, lithium, calcium, gold, antimony, iron, zinc, and combinations thereof, and a conductive carbon.

25 Claims, 8 Drawing Sheets

(51) Int. Cl.
    *H01M 4/04*      (2006.01)
    *H01M 4/62*      (2006.01)
    *H01M 6/04*      (2006.01)
    *H01M 10/28*      (2006.01)
    *H01M 4/02*      (2006.01)

(52) U.S. Cl.
    CPC .............. *H01M 6/04* (2013.01); *H01M 10/28* (2013.01); *H01M 2004/028* (2013.01)

(56) References Cited

FOREIGN PATENT DOCUMENTS

| WO | 2016061030 A1 | 4/2016 |
|---|---|---|
| WO | 2019023546 A2 | 1/2019 |

OTHER PUBLICATIONS

International Search Report and Written Opinion dated Mar. 7, 2019, for International Application No. PCT/US2018/044040, filed on Jul. 27, 2018.

Yadav, Gautam G. et al., "Regenerable Cu-intercalated MnO2 layered cathode for highly cyclable energy dense batteries", Nature Communications, 2017 (Published date: Mar. 6, 2017), vol. 8, Article No. 14424.

Yadav, Gautam G. et al., "Accessing the second electron capacity of MnO2 by exploring complexation and intercalation reactions in energy dense alkaline batteries," International Journal of Hydrogen Energy, 2018 (Online published date: Apr. 3, 2018), vol. 43, No. 17, pp. 8480-8487.

\* cited by examiner

PROCESS FOR MAKING MANGANESE DIOXIDE AND ITS POLYMORPHS REVERSIBLE

CROSS-REFERENCE TO RELATED APPLICATIONS

This application is a filing under 35 U.S.C. 371 as the National Stage of International Application No. PCT/US2018/044040, filed on Jul. 27, 2018 and entitled, "PROCESS FOR MAKING MANGANESE DIOXIDE AND ITS POLYMORPHS REVERSIBLE," which claims the benefit of and claims priority to U.S. Provisional Patent Application No. 62/538,194 filed on Jul. 28, 2017 and entitled "Making Manganese Dioxide and Its Polymorphs Reversible," by Gautam G. Yadav et al., both of which are incorporated herein by reference in their entirety for all purposes.

STATEMENT OF FEDERALLY SPONSORED RESEARCH OR DEVELOPMENT

This invention was made with Government support under grant number DEAR0000150 awarded by the U.S. Department of Energy. The government has certain rights in the invention.

BACKGROUND

Manganese dioxide is an important material used in many applications. It is mostly used in battery applications like lithium-ion and alkaline batteries. In organic electrolyte, ionic liquids and alkaline electrolyte it exhibits a range of chemical reactions. For example, in alkaline electrolyte, manganese dioxides and its polymorphs undergo solid state proton insertion and dissolution-precipitation reactions. However, these reactions result in hausmannite and other inactive phase formation that kill the reversibility of the manganese dioxide electrode.

SUMMARY

The following presents a simplified summary of the innovation in order to provide a basic understanding of some aspects of the systems and methods described herein. This summary is not an extensive overview. It is intended to neither identify key or critical elements of the systems and/or methods nor delineate the scope of the systems and/or methods. Its sole purpose is to present some concepts in a simplified form as a prelude to the more detailed description that is presented later.

In some embodiments, a method of forming a layered manganese dioxide for use in a cathode of a battery comprises disposing a cathode into a housing of an electrochemical cell, disposing an anode into the housing, disposing a polymeric separator between the anode and the cathode such that the anode and the cathode are electrically separated, adding an alkaline electrolyte to the housing, cycling the electrochemical cell into the $2^{nd}$ electron capacity of the manganese dioxide, and forming a layered manganese dioxide having a layered manganese dioxide structure with the one or more additives incorporated into the layered manganese dioxide structure. The cathode comprising a cathode material comprising: a manganese dioxide compound, one or more additives selected from the group consisting of bismuth, copper, tin, lead, silver, cobalt, nickel, magnesium, aluminum, potassium, lithium, calcium, gold, antimony, iron, zinc, and combinations thereof, and a conductive carbon. The additive is in elemental form or a salt form.

In some embodiments, a method of forming a cathode material comprises combining: manganese dioxide, one or more additives selected from the group consisting of bismuth, copper, tin, lead, silver, cobalt, nickel, magnesium, aluminum, potassium, lithium, calcium, gold, antimony, iron, and zinc, and a conductive carbon. The additive is in elemental form or a salt form; and the manganese dioxide has a second electron capacity. The method also comprises forming a cathode mixture based on the combining, cycling the cathode mixture between 0.1-100% of the second electron capacity of the manganese dioxide between limits of greater than or equal to 0.8V and less than or equal to 2.5V vs Zinc or greater than or equal to −0.4V and less than or equal to 1.1V vs Hg|HgO, greater than or equal to 0V and less than or equal to 2.5V vs Zn or greater than or equal to −1.4V and 1.1V vs Hg|HgO, and forming a layered manganese dioxide having a layered manganese dioxide structure with the one or more additives incorporated into the layered manganese dioxide structure.

DETAILED DESCRIPTION

Figure 1:
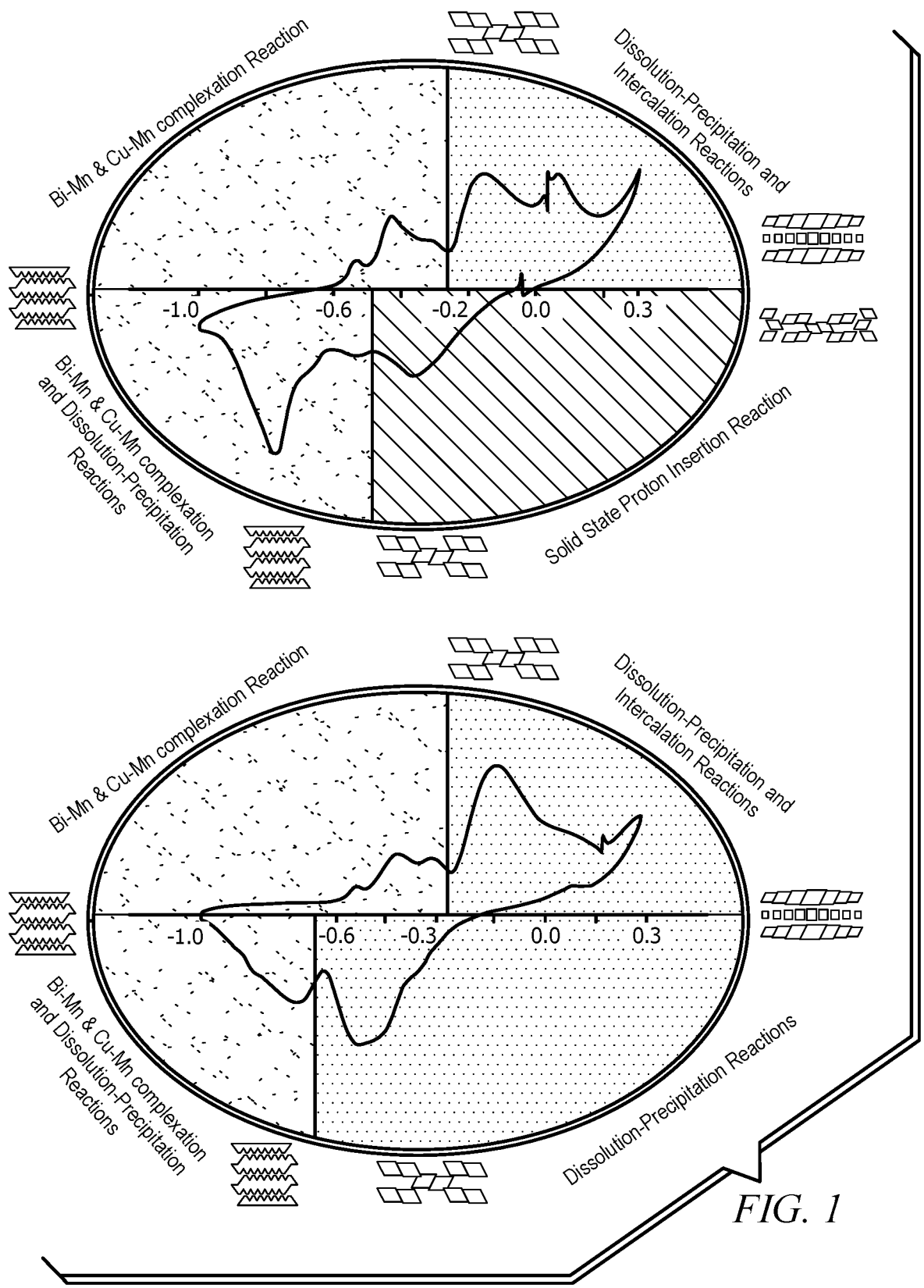
FIG. 1 describes the reactions of manganese dioxide in alkaline electrolyte.

The present systems and methods are best understood by reference to the detailed figure and description set forth herein.

Embodiments are discussed below with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new claims may be formulated to such features and/or combinations of such features during the prosecution of the present Application or of any further Application derived therefrom.

In this disclosure, the terms "negative electrode" and "anode" are both used to mean "negative electrode." Likewise, the terms "positive electrode" and "cathode" are both used to mean "positive electrode." Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused.

In this disclosure, we describe the use of additives that result in the complete or substantially complete reversibility of the manganese dioxide electrode through various reactions, and also, disclose the additional reactions that take place as a result of the addition of these additives. With the use of these additives, the manganese dioxide electrode can be used at the complete second electron capacity for energy dense batteries. These additives also make the primary manganese dioxide electrode rechargeable and allow maximum utilization of capacity out of primary batteries. Also, another use of these new manganese dioxides could be in applications where limited utilization of its capacity or depth-of-discharge of its capacity is required and the electrode is very stable when delivering these capacities.

In this disclosure a stabilized and reversible manganese dioxide electrode is described for use in batteries. The starting manganese dioxide can include any of its polymorphs, which are used in a number of different battery chemistries. For example, the manganese dioxide can be $\alpha$, $\beta$, $\gamma$, $\lambda$, $\varepsilon$, $\delta$, electrolytic manganese dioxide, pyrolusite, ramsdellite, hollandite, romanechite, todorokite, lithiophorite, chalcophanite, sodium or potassium rich birnessite, cryptomelane, buserite, a combination or an intermediate phase of manganese dioxide. The spinel variations of manganese dioxide can also be stable and reversible by the application of the disclosed methods.

In alkaline electrolyte, the most likely phase that is formed after 1-100% utilization of its second electron capacity is the birnessite or $\delta$ phase of manganese dioxide. However, other phases or polymorphs could also be present at the same time or by itself. The hydroxide forms of manganese and water intercalated structures of manganese dioxide can also be stabilized by the use of this method. The method involves the single use or a combination use of metallic forms or compound forms of elements like bismuth, copper, tin, lead, silver, cobalt, nickel, magnesium, aluminum, potassium, lithium, gold, antimony, iron and/or zinc. The manganese dioxide undergoes solid state proton insertion and dissolution-precipitation reactions. The use of these additives adds two more reactions—complexation and intercalation reactions. The layered structures of birnessite are conducive for intercalating the respective metallic ions. If the tunneled phases of manganese dioxide are present then they are also conducive for inserting the respective metallic ions for stability. Other mechanisms could also be possibilities that help achieve the stability and reversibility, for example—reducing pore electrolyte resistance. The synthesis of the intercalated birnessite is done through either electrochemical or chemical methods. An advantage that is realized by use of this method is the reversibility of the manganese dioxide material.

The present description deals with methods to stabilize and make manganese dioxide reversible. This is applicable to all of the polymorphic forms of manganese dioxide. Because of the complexity of the manganese dioxide crystal structure, one or more of its polymorphic forms could be present at the same time during the reactions in alkaline electrolyte. However, the most common phase that is present after repeated cycling at 1-100% of the second electron capacity is the birnessite or $\delta$ phase of manganese dioxide.

The advantage of this method is achieving the complete stability and reversibility of manganese dioxide for use in energy dense batteries. This method also allows for the partial accessibility of the second electron capacity, where for certain applications limited depth-of-discharge maybe a necessity. This method also allows for making the primary manganese dioxide rechargeable or allow for higher accessibility of the capacity in primary/one-time use applications.

In order to form a stable manganese dioxide that has reversibility within its second electron capacity, a starting manganese dioxide composition can be combined with one or more metallic elements or compounds. The resulting composition can be cycled against an anode, where the manganese dioxide can be cycled within its second electron capacity. When the metallic elements or compounds are also active within the cycled range, the metallic elements can undergo reactions that result in the metallic elements being inserted into the structure of the manganese dioxide. Since birnessite can be formed when manganese dioxide is cycled within its second electron capacity, the resulting material can comprise birnessite having the metallic elements inserted into the crystal structure. This material can then be used as a cathode within a battery.

In general, birnessite has a formula:

$$(Na_XCa_YK_Z)(Mn^{4+},Mn^{3+})_2O_4$$

where X may have a value between 0 and about 0.4, Y has a value between 0 and about 0.15, and Z has a value between 0 and about 0.15. In some embodiments, the birnessite may not have one or more of the sodium, calcium, or potassium ions present. The structure of birnessite consists of a sheet-like structure with layers of $MnO_6$ octahedra formed as sheets. Layers of water can be present between the manganese dioxide sheets, though some or all of the water an be replaced by one or more other elements or compounds. As disclosed herein, various metallic elements can be inserted into the sheet structure of the birnessite using the processes disclosed herein. For example, the metallic element(s) can be inserted into the layered structure of the birnessite through an intercalation reaction or process. As used herein, an element incorporated into the layered manganese dioxide structure refers to the presence of atoms, ions, or compounds incorporated into the sheet-like layers of the birnessite (e.g., between the manganese dioxide sheet layers and/or complexed with the manganese dioxide sheet layers or any intervening layers).

In alkaline electrolyte, the manganese dioxide formed while reducing and oxidizing at any utilization of the theoretical $2^{nd}$ electron capacity (e.g., 617 mAh/g) results in the layered or layered-like phase formation of manganese dioxide. A number of different polymorphs of manganese dioxide exhibit layered like characteristics. Birnessite, cryptomelane, buserite, lithiophorite, chalcophanite, etc. all exhibit layered characteristics. If lithium hydroxide is used, then lithiated manganese dioxide or lithiophorite can be formed. If zinc is used as the counter electrode or zinc ions are present in the electrolyte, there is a possibility of chalcophanite or zinc birnessite phase forming as well. Sometimes the layered phases can interchange between the spinel phases as well and form compounds like $Mn_3O_4$, $ZnMn_2O_4$, $LiMn_2O_4$, $AlMn_2O_4$, $CuMn_2O_4$, $MgMn_2O_4$, etc. The complexity of the manganese dioxide phase results in a number of polymorphs existing at any given time. The use of the term birnessite herein encompasses all the layered phases that could be present and also its interchangeability with the spinel phases.

The method involves the use of a single or combination of metallic forms or compounds of metallic elements. Thus, the manganese dioxide in one or more forms can be combined or mixed with the single or combination of metallic forms or compounds to form a cathode material during the formation process. Suitable metallic elements can include, but are not limited to, bismuth, copper, tin, lead, silver, cobalt, nickel, magnesium, aluminum, potassium, lithium, gold, antimony, iron, zinc, and combinations thereof. In some embodiments, copper can be used, which may enhance the charge transfer characteristics of manganese dioxide through intercalation mechanisms and/or reduce pre electrolyte resistance. The manganese dioxide undergoes solid state proton insertion and dissolution-precipitation reactions during the normal charge and discharge cycles of the battery. The use of these additives adds two more reactions—complexation and intercalation reactions. Other mechanisms may also be present which help in the reversibility and stability of the manganese dioxides. The practicality of this method lies in the direct addition of the metallic forms or compound forms of the elements aforementioned. The complex electrochemistry of manganese dioxide allows for the incorporation of these elements while electrochemical cycling. However, if required, ex-situ synthesis methods like hydrothermal reactions, solid-state reactions, and/or sol-gel synthesis can also be used to incorporate the additives.

The description of the electrochemical method does not preclude the use of the aforementioned synthesis methods. The electrochemical method involves the use of alkaline electrolyte (sodium hydroxide, potassium hydroxide, lithium hydroxide, cesium hydroxide, barium hydroxide or a mixture of these) with a manganese dioxide electrode. The manganese dioxide electrode can contain any of the polymorphs of manganese dioxide like α, β, γ, λ, ε, δ, electrolytic manganese dioxide, pyrolusite, ramsdellite, hollandite, romanechite, todorokite, lithiophorite, chalcophanite, sodium or potassium rich birnessite, cryptomelane, buserite, a combination or an intermediate phase of manganese dioxide. It can also be a spinel manganese dioxide, hydroxide forms of manganese, manganese oxide, a partially protonated manganese dioxide, a partially or fully lithiated manganese dioxide, a water intercalated structure of manganese dioxide, a copper intercalated structure of manganese dioxide, or any combination thereof. As described in more detail below, carbon can be used to impart conductivity to the manganese dioxide.

In some embodiments, the one or more additives can comprise a bismuth compound and copper, which together allow galvanostatic battery cycling of the cathode. The bismuth compound can be included into the manganese dioxide in the mixture as an inorganic or organic salt of bismuth (oxidation states 5, 4, 3, 2, or 1), as a bismuth oxide, or as bismuth metal (i.e. elemental bismuth). The bismuth compound can be present at a concentration between 1-20 wt %. Examples of inorganic bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth.

The copper compound can be incorporated into manganese dioxide in the mixture as an organic or inorganic salt of copper (oxidation states 1, 2, 3 or 4), as a copper oxide, or as copper metal (i.e. elemental copper). The copper compound is present in a concentration between 1-70 wt %. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc.

The additives that are added to the manganese dioxide electrode to aid in reversibility can be in powder form or metallic form. Metallic powders can also be used. A way of incorporated the metallic forms of the additives can include the use of metallic substrates, wires, mesh, etc. Binder may or may not be used when making the manganese dioxide electrode. The counter electrode used in the cathode material setup can be nickel oxyhydroxide (NiOOH). Other high potential generating counter electrodes like zinc, lithium, aluminum, magnesium, iron, bismuth, etc. can also be used. All of the potentials with NiOOH as the counter electrodes are described herein with respect to the reference electrode mercury/mercury oxide (Hg|HgO). If zinc is used as the anode rather than NiOOH, 1.4 V can be added to the Hg|HgO potentials disclosed herein to give the approximate potentials to be used. In some embodiments, the anode can also comprise sodium.

In some embodiments, the manganese dioxide having the metallic elements or compounds mixed therein can be cycled between −1 V vs Hg|HgO and 0.3 V vs Hg|HgO. In some embodiments, the manganese dioxide having the metallic elements or compounds mixed therein can be cycled between −2 V vs Hg|HgO and 1 V vs Hg|HgO. The birnessite phase formation can happen between the limits of −2 V and 1V vs Hg|HgO. Generally, the layer formation reactions are seen between −0.3 V and 1 V vs Hg|HgO. Between −0.3 V and −2 V vs Hg|HgO, the layered phases of $Mn(OH)_2$ are generally seen.

Within the production process, the metallic elements being inserted into the manganese dioxide structure should be electrochemically active within the range of potentials at which the manganese dioxide is being cycled in order to assist with the inclusion of the elements in the crystal structure. Thus, the anode material as well as the range of potentials cycled through can both be selected to allow for a desired element or combination of elements or compounds to be incorporated into the manganese dioxide structure.

Various reactions can take place during the cycling of the cathode material. A cyclic voltammetry curve of the first cycle for an example of manganese dioxide mixed with bismuth and copper is shown in FIG. 1 (top part). The incorporation of the additives into the structure of the manganese dioxide takes one-step, where the manganese dioxide electrode can be discharged or reduced vs Hg|HgO to −1V and charged or oxidized vs Hg|HgO to 0.3V. In the example shown in FIG. 1, copper and bismuth oxide are used as additives in the mixture with manganese dioxide. Copper and bismuth oxide have reactions that are also present in the potential range of −1V and 0.3V vs Hg|HgO. If additives comprising nickel, silver, cobalt, aluminum, tin, magnesium, iron, etc. are used, then the potential range can be expanded between −2V and 1V vs Hg|HgO. EMD or γ-$MnO_2$ is used as an example for the manganese dioxide in this example, where the reduction and oxidation of the EMD results in a change in the crystal structure of EMD to form the layered birnessite or δ-$MnO_2$. While described with respect to EMD or γ-$MnO_2$, any of the other polymorphs of manganese dioxide are expected to have similar results to be able to form the layered birnessite or δ-$MnO_2$. With the addition of Bi and Cu, their respective reactions also occur in this range. The range of the reactions are shown in the four quadrants of FIG. 1 (top portion). After the first cycle, the reactions seen in the cyclic voltammetry curves are of the birnessite phase shown in the bottom portion of FIG. 1.

The electrolyte used in the formation of the layered manganese dioxide material can be acidic, alkaline, ionic liquids, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, perchlorates like lithium perchlorate, magnesium perchlorate, aluminum perchlorate, lithium hexafluorophosphate, $[M^+][AlCl_4^-](M^+)$]-sulphonyl chloride or phosphoryl chloride cations, 1-ethyl-3-methylimidazolium bis (trifluoromethylsulfonyl)imide, 1-ethyl-3-methylimidazolium trifluoromethanesulfonate, 1-butyl-1-methylpyrrolidinium bis(trifluoromethylsulfonyl)imide,1-hexyl-3-methylimidazolium hexofluorophosphate, 1-ethyl-3-methylimidazolium dicyanamide,11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis (hexamethyldisilazide) in tetrahydrofuran etc. and combinations thereof.

The manganese dioxide electrode can be pasted on a number of substrates like aluminum, copper, nickel, etc. depending on the substrates stability with the choice of electrolyte. While the substrate can be used to include the metallic element(s) or compound(s) into the layered manganese dioxide structure, the substrate can also be chemically stable within the ranges of the potentials used during the formation process.

The manganese dioxide electrode paste can comprise between 1-99 wt. % any polymorph of manganese dioxide, 0-99 wt. % conductive material, and the remaining portions can be additives including the metallic element(s) and/or compound(s).

The conductive material can be TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), graphene, graphyne, graphene oxide, Zenyatta graphite, nanowires of copper, nickel and silver, carbon nanotubes plated with nickel and combinations thereof.

The binders which may or may not be used can be methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC), TEFLON, sodium alginate, styrene-butadiene rubber, polyvinylidene fluoride and combinations thereof. If binders are used then less than or equal to about 4-5 wt. % is required.

The electrode paste can be adhered to the metallic support on the working electrode by pressing at, for example, a pressure between 1,000 psi and 20,000 psi (between $6.9\times10^6$ and $1.4\times10^8$ Pascals). The separator clearly demarcates the cathode from the anode electrode. The separator may be a polymeric separator (e.g. cellophane, sintered polymer film, Celgard).

The addition of one or more additives into a layered manganese dioxide can have a number of beneficial effects. In some embodiments, the capacity retention of an electrochemical cell having the layered manganese dioxide can be retained when cycled within the $2^{nd}$ a electron capacity with greater than about 80%, greater than about 90%, greater than about 95%, or greater than about 99% of the theoretical capacity of manganese dioxide (e.g., about 617 mAh/g) being retained for at least five, at least ten, or at least 50 cycles.

The method described herein can be used to form a manganese dioxide having a layered structure with one or more element(s) and/or compound(s) incorporated within the layered structure. For example, birnessite can be formed with one or more metallic elements incorporated therein. The resulting material can be used in the form in which it is produced for form an electrode (e.g., a cathode) within a battery or cell, and/or the material can be removed, processed, combined with one or more additional elements, and formed into an electrode (e.g., a cathode) for a battery. In some embodiments, the method described herein can be used on a relatively large scale to form a cathode comprising the desired layered material. The resulting material can then be removed from the cathode, crushed, and subsequently processed into a new electrode, such as a cathode, for a different cell. This formation technique may allow for large scale production of a cathode material. Further, the resulting battery or cell can then have the same or a different material used to form an anode. This may allow for careful control over the formation process while enabling different chemistries within the final cell.

When the cathode material is used in a separate cathode mixture to form a battery, the resulting layered manganese dioxide can be combined with a number of additives such as binders, conductive agents, additives, and then pressed onto a current collector to form a cathode for a battery.

The conductive carbon used in a cathode for a battery can be present in a concentration between 2-30 wt %. Such conductive carbon include single walled carbon nanotubes, multiwalled carbon nanotubes, graphene, carbon blacks of various surface areas, and others that have specifically very high surface area and conductivity. Higher loadings of the layered $MnO_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), graphene, graphyne, graphene oxide, and combinations thereof.

In addition to the additives added during the formation process of the layered $MnO_2$, additional conductive metal additives can be used to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide $[Mn(OH)_2]$ which is non-conductive. This ultimately results in a capacity fade in subsequent cycles. Suitable second additives include transition metals like Ni, Co, Fe, Ti and metals like Ag, Au, Al, Ca. Salts or such metals are also suitable. Transition metals like Co also help in reducing the solubility of $Mn^{3+}$ ions. Such conductive metal additives may be incorporated into the electrode by chemical means or by physical means (e.g. ball milling, mortar/pestle, spex mixture).

In some embodiments a binder can be used with the layered $MnO_2$ to form a cathode for a battery. The binder can be present in a concentration of 0-10 wt %. In some embodiments, the binder comprises water-soluble cellulose-based hydrogels, which were used as thickeners and strong binders, and have been cross-linked with good mechanical strength and with conductive polymers. The binder may also be a cellulose film sold as cellophane. The binders can be made by physically cross-linking the water-soluble cellulose-based hydrogels with a polymer through repeated cooling and thawing cycles. In one embodiment, 0-10 wt. % carboxymethyl cellulose (CMC) solution was cross-linked with 0-10 wt. % polyvinyl alcohol (PVA) on an equal volume basis. The binder, compared to the traditionally-used TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon were used to create rollable binders. Using the aqueous-based binder helps in achieving a significant fraction of the two electron capacity with minimal capacity loss over 350 cycles. In one embodiment, the binder is water-based, has superior water retention capabilities, adhesion properties, and helps to maintain the conductivity relative to identical cathode using a TEFLON® binder instead. Examples of hydrogels include methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In one such embodiment, a 0-10 wt % solution of water-cased cellulose hydrogen is cross linked with a 0-10% wt solution of crosslinking polymers by, for example, repeated freeze/thaw cycles, radiation treatment or chemical agents (e.g. epichlorohydrin). The aqueous binder may be mixed with 0-5% TEFLON® to improve manufacturability. The birnessite discharge reaction comprises a dissolution-precipitation reaction where $Mn^{3+}$ ions become soluble and precipitate out on the conductive carbon as $Mn^{2+}$. This second electron process involves the formation of a non-conductive manganese hydroxide $[Mn(OH)_2]$ layer on the conductive graphite.

Figure 2:
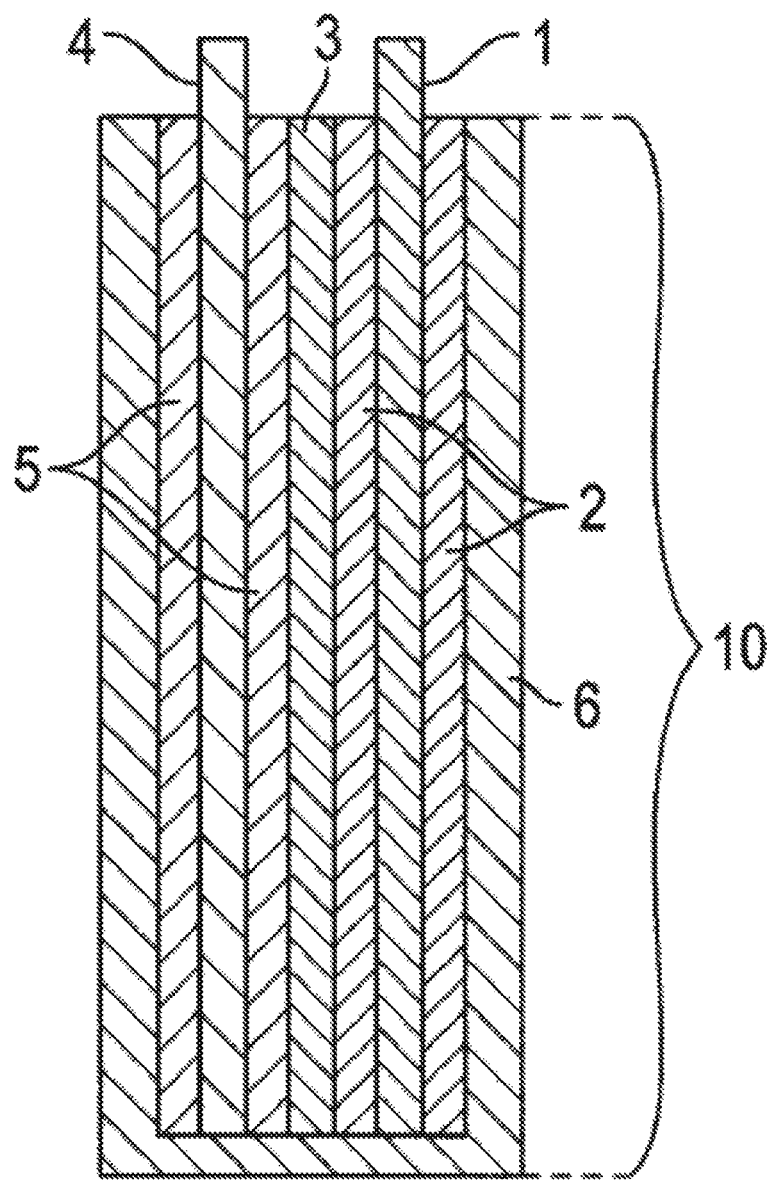
FIG. 2 is a cross section view of an embodiment of the battery in a prismatic arrangement.

The resulting cathode comprising the layered $MnO_2$ can be used in a battery. Referring to FIG. 2, a battery 10 has a housing 6, a cathode current collector 1, a cathode material 2, a separator 3, an anode current collector 4, and an anode material 5. FIG. 2 shows a prismatic battery arrangement. In another embodiment, the battery is a cylindrical battery. An electrolyte is dispersed in an open space throughout battery 10. Referring to FIG. 2 the cathode current collector 1 and cathode material 2 are collectively called either the cathode 12 or the positive electrode 12. The anode can comprise any suitable materials such as zinc, nickel oxyhydroxide (NiOOH), iron, cadmium and metal hydride (MH).

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 3A:
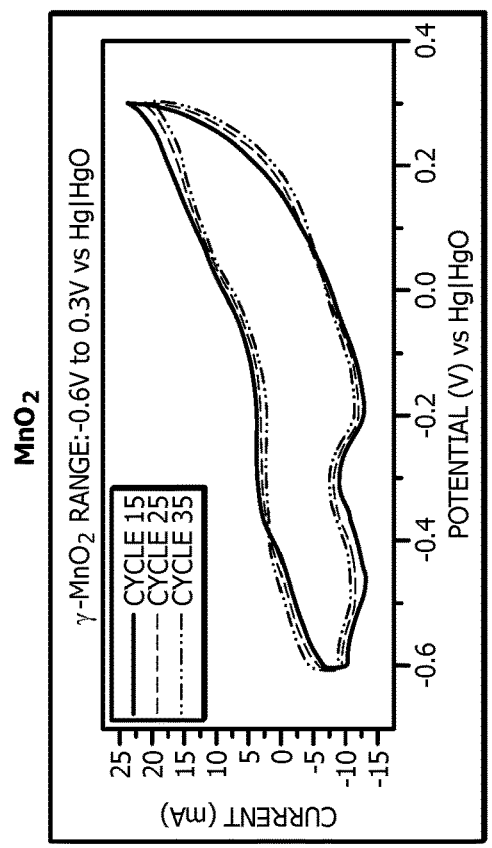
FIG. 3A-3L describes the Cyclic voltammetry (CV) curves of only $MnO_2$ (3A-3D), where the potential limits tested are between −0.6V and 0.3V vs Hg|HgO and −1V and 0.3V vs Hg|HgO. CV curves of $MnO_2+Bi_2O_3$ (3E-3H), where the potential limits tested are between −0.6V and 0.3V vs Hg|HgO and −1V and 0.3V vs Hg|HgO. CV curves of $MnO_2+Cu$ (3I-3L), where the potential limits tested are between the same limits as mentioned previously.
Figure 3B:
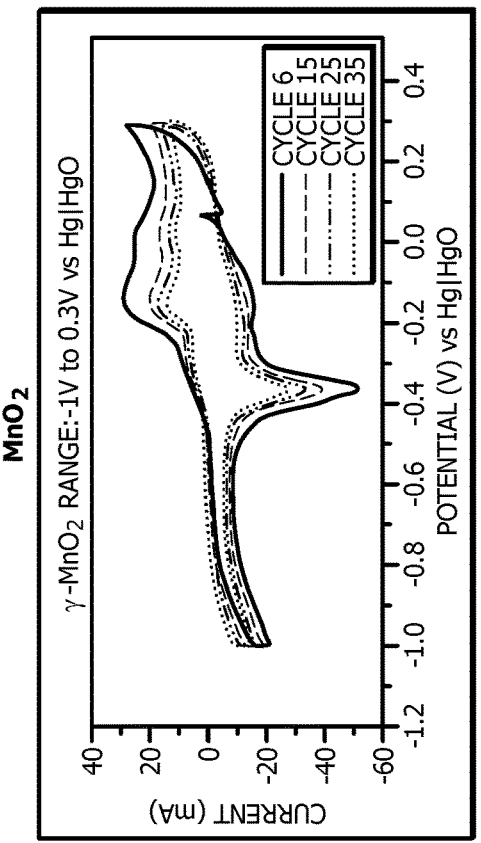
Figure 3C:
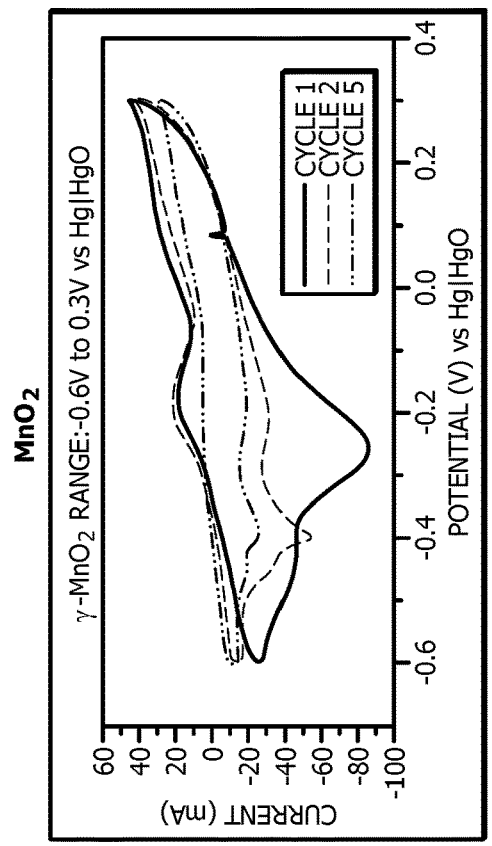
Figure 3D:
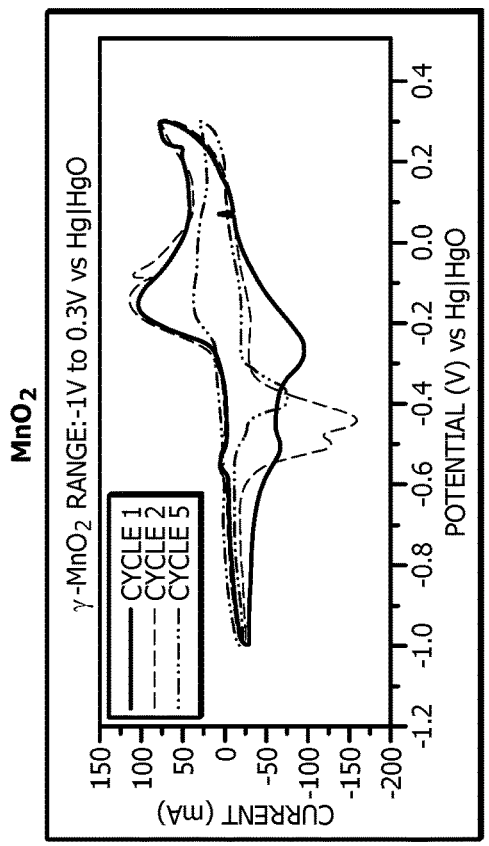
Figure 3F:
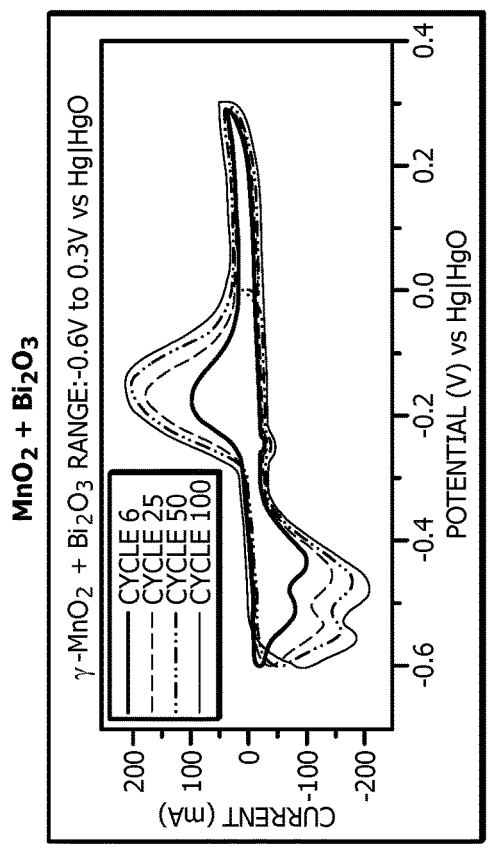
Figure 3H:
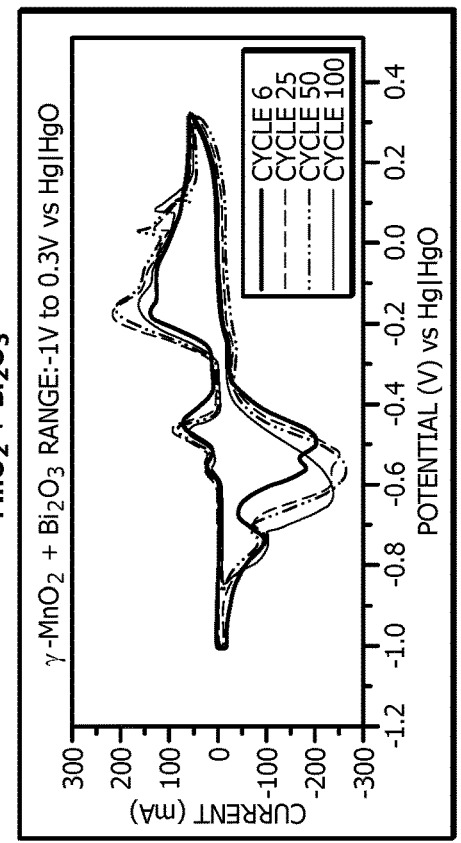
Figure 3E:
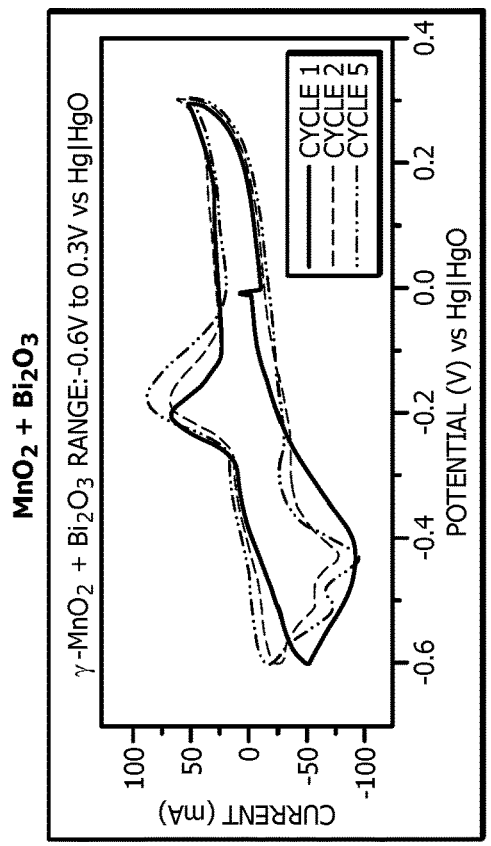
Figure 3G:
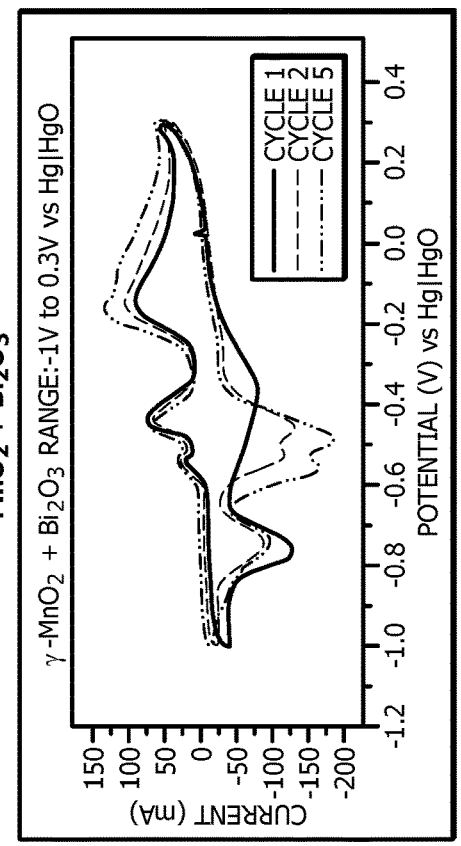
Figure 3I:
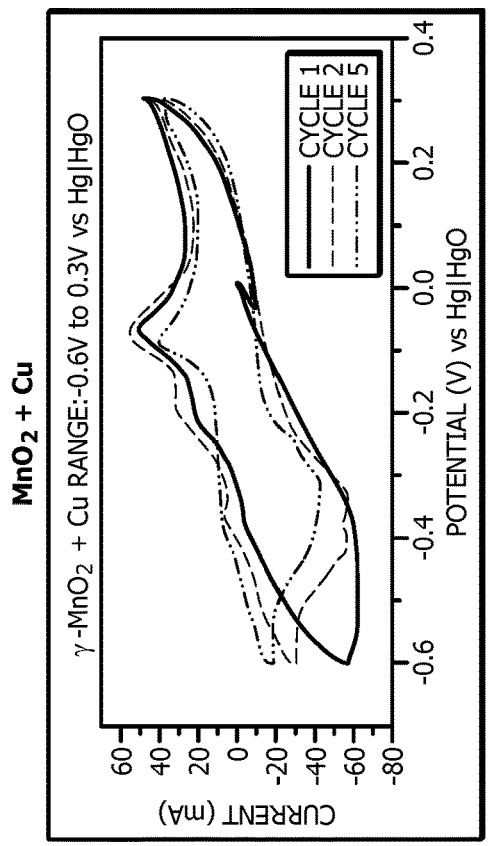
Figure 3J:
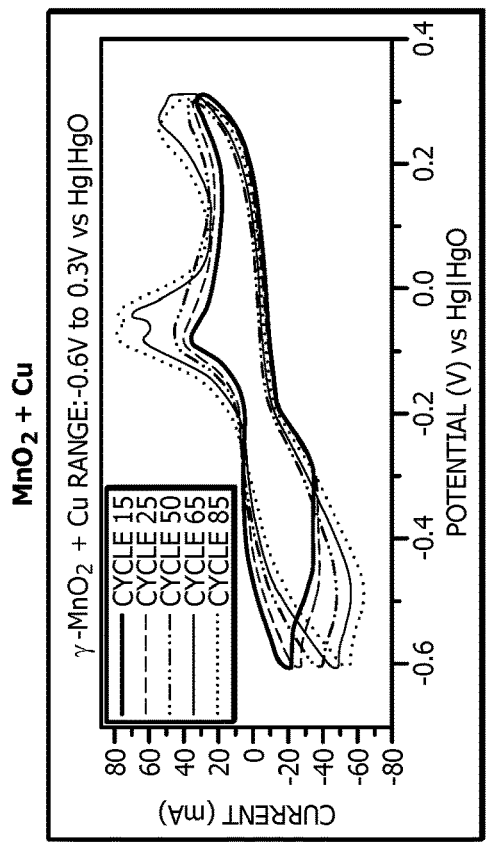
Figure 3K:
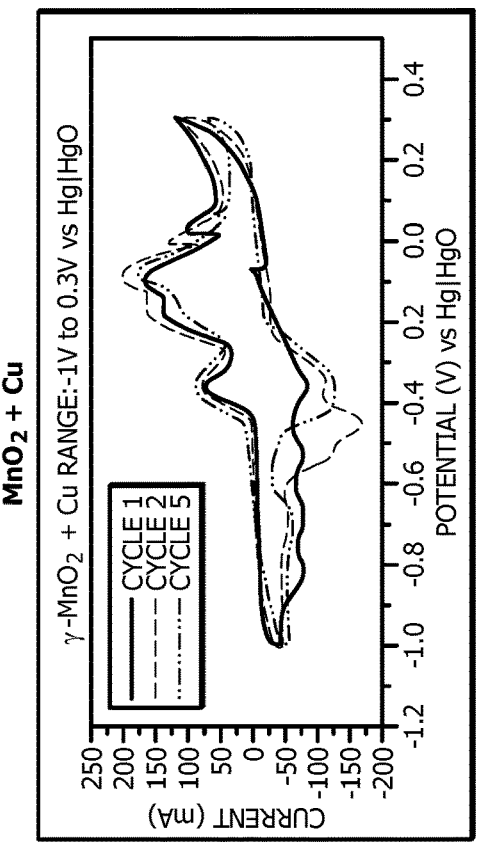
Figure 3L:
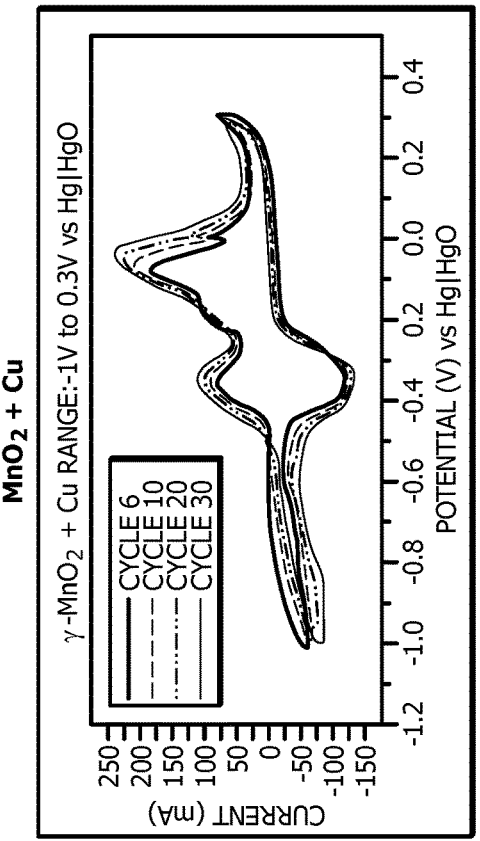
Figure 4A:
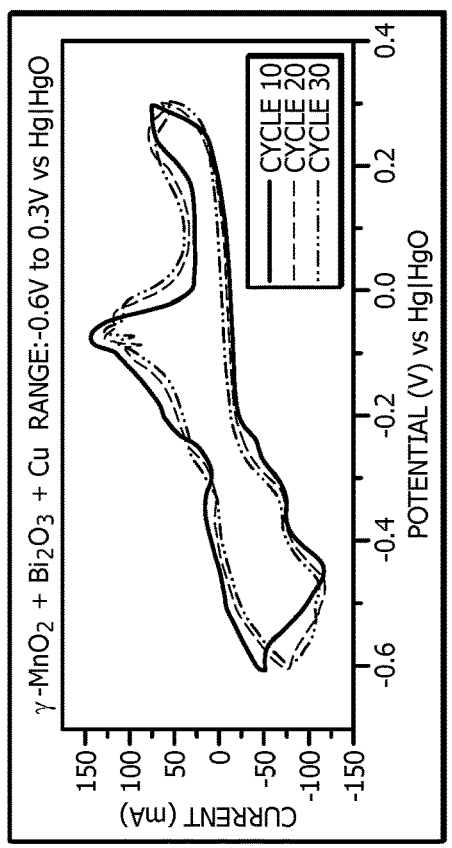
FIG. 4A-4D describes the CV curves of $MnO_2+Bi_2O_3+Cu$ between −0.6V and 0.3V vs Hg|HgO and −1V and 0.3V vs Hg|HgO.
Figure 4B:
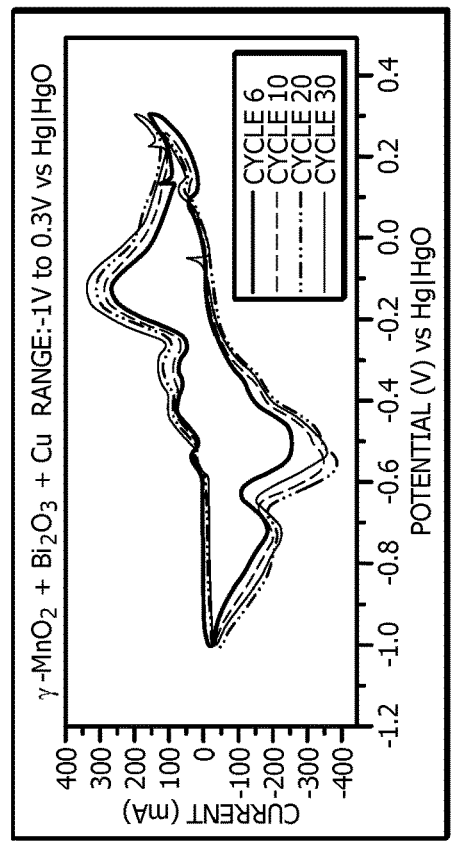
Figure 4C:
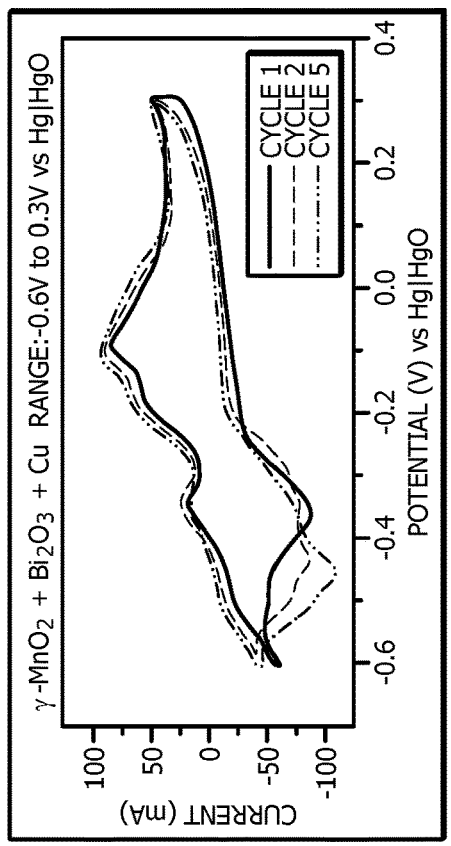
Figure 4D:
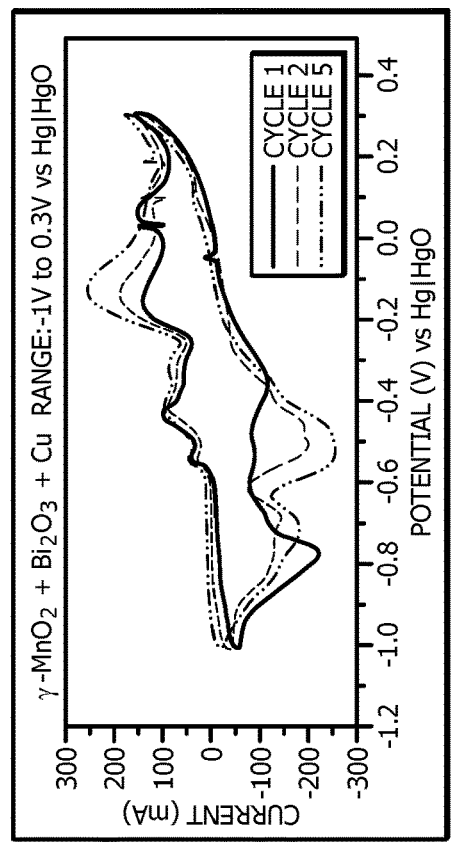
Figure 5A:
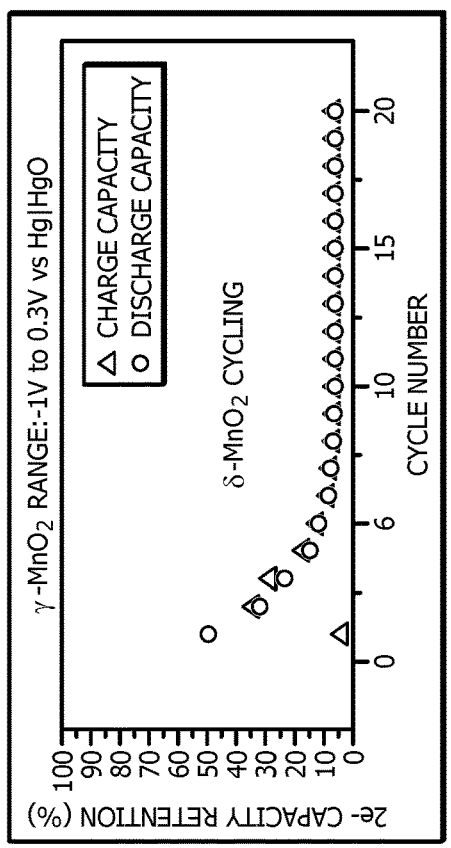
FIG. 5A-5H describes the Galvanostatic plots of manganese dioxide with additives using a combinatorial approach between −0.6V and 0.3V vs Hg|HgO and −1V and 0.3V vs Hg|HgO.
Figure 5B:
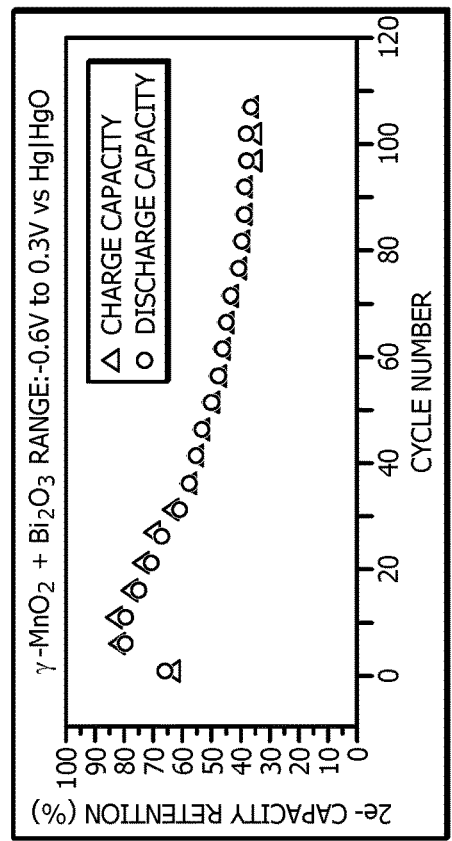
Figure 5C:
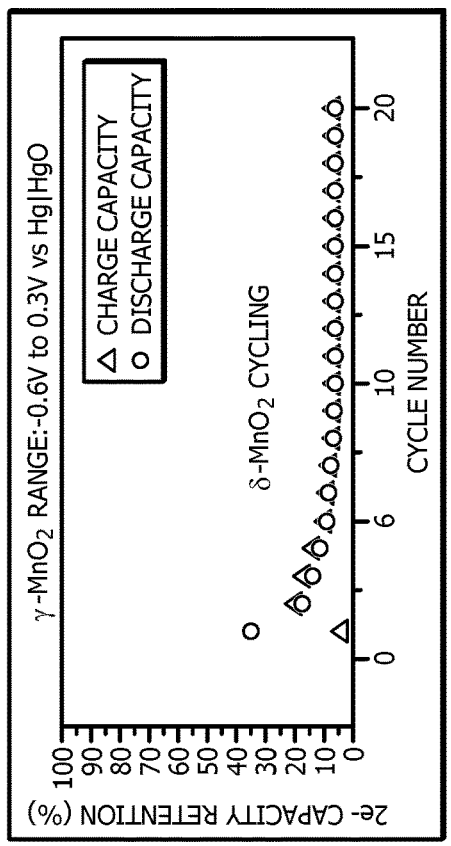
Figure 5D:
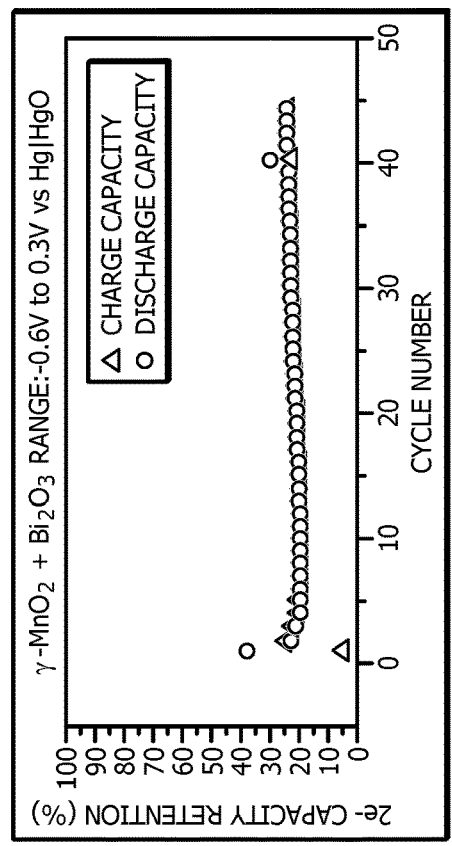
Figure 5E:
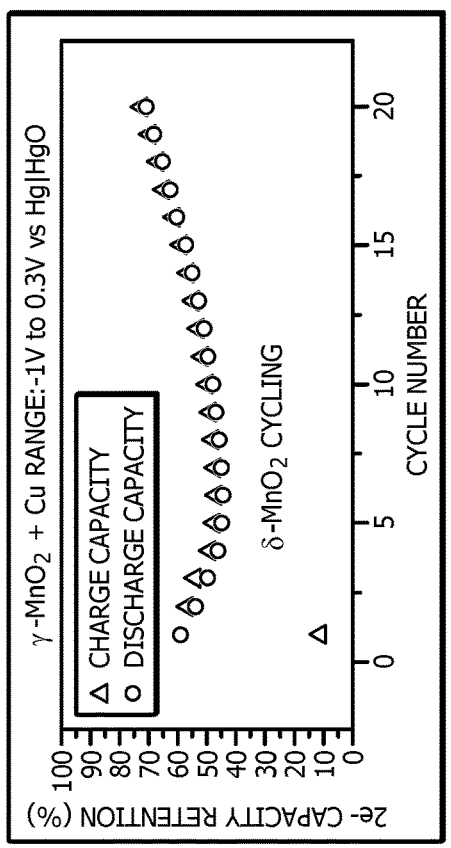
Figure 5F:
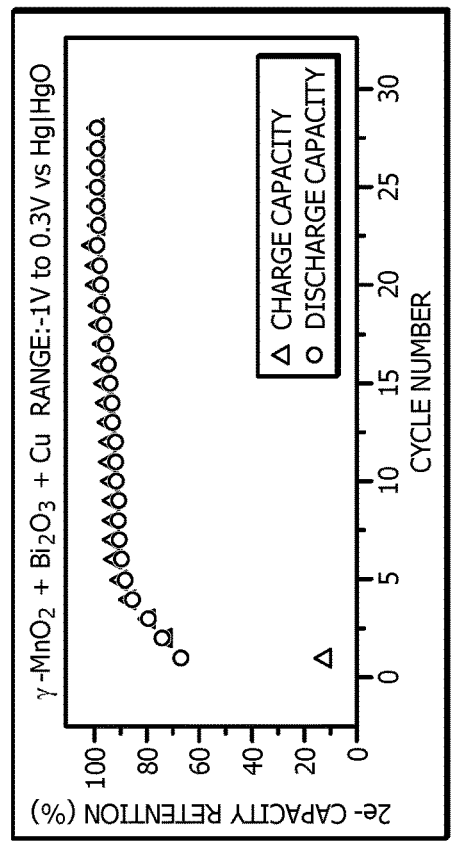
Figure 5G:
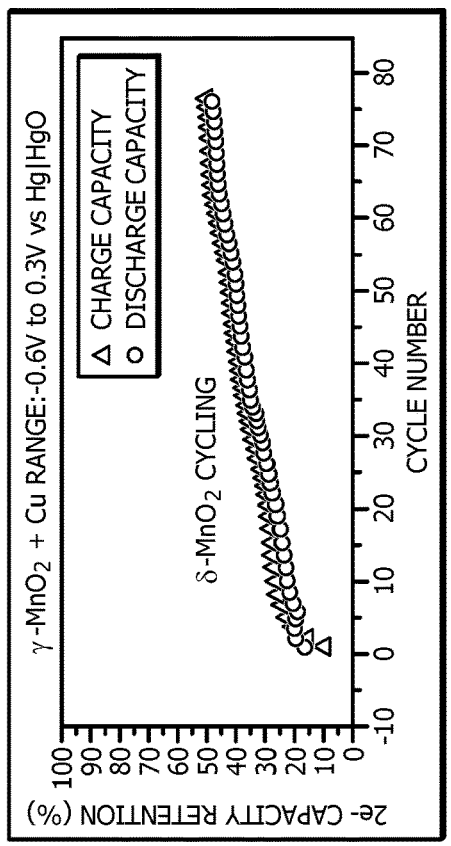
Figure 5H:
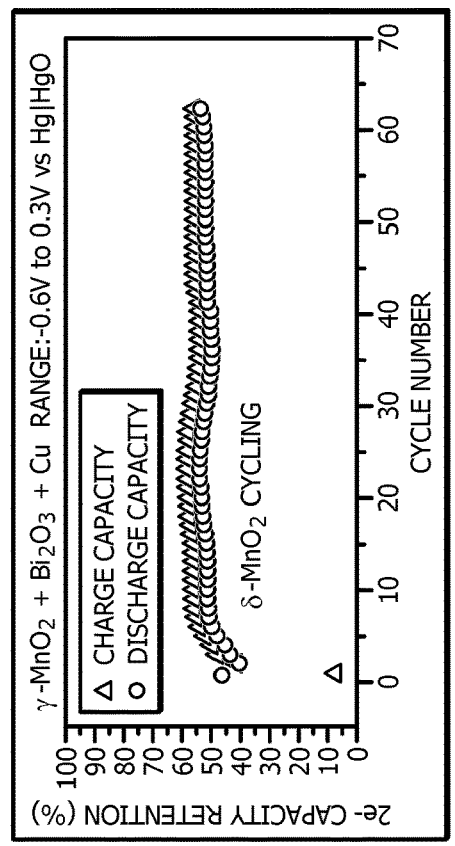

In a first example, a combinatorial set of experiments was performed to show the beneficial effect of the additives. The cyclic voltammetry (CV) curves are shown in FIG. 3. A 5 wt. % loading of manganese dioxide (EMD) was used in the mix with the remaining being balanced by graphite. FIGS. 3A-3D clearly show that manganese dioxide is irreversible when cycled by itself. It deteriorates to form inactive phases of $Mn_3O_4$. FIGS. 3E-3H shows the beneficial effects of adding bismuth oxide to the mix (1 wt. %). FIGS. 3E and 3F shows that simply the presence of bismuth oxide is enough for manganese dioxide to be rechargeable, activation is not necessary as shown in FIGS. 3H and 3G. However, for maximum capacity retention of the theoretical capacity activation of the lower potentials between −0.6V and −1V vs Hg|HgO is essential. FIGS. 3I-3L show the beneficial effect of adding only copper to the mix. In this example, copper was added as a substrate which acted as a support for the manganese dioxide mix. Copper also helps in the reversibility of manganese dioxide. In fact it acts as a better additive than bismuth oxide as it helps to obtain a higher capacity retention between −0.6V and 0.3V vs Hg|HgO.

Example 2

In a second example, bismuth oxide and copper were both added to the mix with manganese dioxide. The weight percent loadings of the manganese dioxide and the additives as same as example 2. The presence of both additives is very beneficial in obtaining a higher retention in capacity much quicker than simply having standalone additives of one another as shown in FIGS. 4A-4D. When the manganese dioxide is cycled between −1V and 0.3V vs Hg|HgO with both the additives the capacity retention is 100% of the theoretical capacity of manganese dioxide.

Example 3

In a third example, manganese dioxide, bismuth oxide and copper with the same weight % loadings as the previous examples were cycled galvanostatically as shown in FIGS. 5A-5H. A combinatorial approach was also used in this example. Without the additives the capacity retention of manganese dioxide was very poor. The addition of bismuth oxide imparted rechargeability; however, the capacity retention was much better when the cycling was between −1V and 0.3V vs Hg|HgO. Copper addition was shown to be the most important additive as it imparted reversibility and much superior capacity retention by itself when cycled to −0.6V or −1V vs Hg|HgO. The full capacity retention of the theoretical value was much faster when both bismuth oxide and copper were used together.

Having described various methods and devices, certain embodiments can include, but are not limited to:

In a first embodiment, an electrode comprises: a manganese oxide compound; one or more additives selected from the group consisting of bismuth, copper, tin, lead, silver, cobalt, nickel, magnesium, aluminum, potassium, lithium, calcium, gold, antimony, iron and zinc, wherein the additive is in elemental form or a salt form; and a conductive carbon.

A second embodiment can include the electrode of the first embodiment, wherein the manganese dioxide compound is α, β, γ, λ, ε, δ, electrolytic manganese dioxide, pyrolusite, birnessite, ramsdellite, hollandite, romanechite, todorokite, lithiophorite, chalcophanite, sodium or potassium rich birnessite, cryptomelane, buserite, manganese oxide, a spinel form of manganese dioxide, a partially or fully protonated ($H^+$) structure of manganese dioxide or manganese oxide or manganese hydroxide, a hydroxide structure of manganese, a partially or fully lithiated structure of manganese dioxide, a water intercalated structure of manganese dioxide, a copper intercalated structure of manganese dioxide, a combination or an intermediate phase of manganese dioxide.

A third embodiment can include the electrode of the first or second embodiment, wherein the spinel form of manganese dioxide is $Mn_3O_4$, $ZnMn_2O_4$, $LiMn_2O_4$, $AlMn_2O_4$, $CuMn_2O_4$, $HMn_2O_4$, $MgMn_2O_4$, or combinations thereof.

A fourth embodiment can include the electrode of any one of the first to third embodiments, wherein the hydroxide structure of manganese is $α,γ,β,δ$-MnOOH or $Mn(OH)_2$.

A fifth embodiment can include the electrode of any one of the first to fourth embodiments, wherein the additive is in oxide or hydroxide forms, or elemental forms.

A sixth embodiment can include the electrode of the fifth embodiment, wherein the additive is bismuth oxide, bismuth hydroxide, copper oxide, copper hydroxide, cobalt hydroxide, lead oxide, silver oxide, nickel oxide, nickel hydroxide, lithium hydroxide, nickel, copper, bismuth or cobalt.

A seventh embodiment can include the electrode of the first or fifth embodiment, wherein the additive is copper and is in powder form or metallic support form.

An eighth embodiment can include the electrode of any one of the first to seventh embodiments, wherein the conductive carbon is selected from the group consisting of graphite, carbon black, acetylene black, single walled carbon nanotubes, multi-walled carbon nanotubes, graphene, graphyne, graphene oxide, and combinations thereof.

A ninth embodiment can include the electrode of any one of the first to eighth embodiments, wherein the electrode consists essentially of greater than 0 wt. % and less than or equal to 99 wt. % of the manganese oxide, wherein the manganese oxide is manganese dioxide; greater than 0 wt. % and less than or equal to 99 wt. % of the conductive carbon; and the balance being covered by the additive.

A tenth embodiment can include the electrode of any one of the first to ninth embodiments, wherein the electrode has a porosity between 5-95%.

In an eleventh embodiment, a battery comprises: a housing; an electrolyte disposed in the housing; an anode disposed in the housing; a cathode disposed in the housing and comprising a cathode material comprising: a manganese oxide compound; one or more additives selected from the group consisting of bismuth, copper, tin, lead, silver, cobalt, nickel, magnesium, aluminum, potassium, lithium, calcium, gold, antimony, iron and zinc wherein the additive is in elemental form or a salt form; and a conductive carbon.

A twelfth embodiment can include the battery of the eleventh embodiment, wherein the battery is a secondary battery that is galvanostatically rechargeable for at least ten cycles.

A thirteenth embodiment can include the battery of the eleventh or twelfth embodiment, wherein manganese dioxide has a second electron capacity and the battery is a primary battery that delivers 1-100% of the second electron capacity of manganese dioxide.

A fourteenth embodiment can include the battery of any one of the eleventh to thirteenth embodiments, wherein manganese dioxide has a second electron capacity and the battery delivers a limited utilization of the second electron capacity for at least ten cycles.

A fifteenth embodiment can include the battery of any one of the eleventh to fourteenth embodiments, wherein the anode is zinc, lithium, aluminum, magnesium, iron, potassium, calcium, selenium or nickel oxyhydroxide.

A sixteenth embodiment can include the battery of any one of the eleventh to fifteenth embodiments, further comprising a polymeric separator between the anode and cathode.

A seventeenth embodiment can include the battery of the sixteenth embodiment, wherein the polymeric separator comprises a polymer selected from the group consisting of a cellulose film, a sintered polymer film, a hydrophilically modified polyolefin, or combinations thereof.

An eighteenth embodiment can include the battery of any one of the eleventh to seventeenth embodiments, wherein the electrolyte is acidic, alkaline, an ionic liquid, an organic-based, solid-phase, gel or combinations thereof that conducts lithium, magnesium, aluminum, potassium, calcium or zinc ions.

A nineteenth embodiment can include the battery of any one of the eleventh to eighteenth embodiments, wherein manganese dioxide has a second electron capacity and stabilized manganese dioxide and reversible manganese dioxide is formed by cycling 0.1-100% of the second electron capacity between limits of greater than or equal to 0.8V and less than or equal to 2.5V vs Zinc or greater than or equal to −0.4V and less than or equal to 1.1V vs Hg|HgO, greater than or equal to 0V and less than or equal to 2.5 Vvs Zn or greater than or equal to −1.4V and 1.1V vs Hg|HgO.

In a twentieth embodiment, a method of producing a battery comprises steps of: disposing a cathode into a housing, the cathode comprising a cathode material comprising: a manganese oxide compound; one or more additives selected from the group consisting of bismuth, copper, tin, lead, silver, cobalt, nickel, magnesium, aluminum, potassium, lithium, calcium, gold, antimony, iron, zinc, and combinations thereof, wherein the additive is in elemental form or a salt form; and a conductive carbon; disposing an anode into the housing; disposing a polymeric separator between the anode and the cathode such that the anode and the cathode are electrically separated; adding an alkaline electrolyte to the housing.

In a twenty first embodiment, a method of forming a layered manganese dioxide for use in a cathode of a battery comprises: disposing a cathode into a housing of an electrochemical cell, the cathode comprising a cathode material comprising: a manganese dioxide compound; one or more additives selected from the group consisting of bismuth, copper, tin, lead, silver, cobalt, nickel, magnesium, aluminum, potassium, lithium, calcium, gold, antimony, iron, zinc, and combinations thereof, wherein the additive is in elemental form or a salt form; and a conductive carbon; disposing an anode into the housing; disposing a polymeric separator between the anode and the cathode such that the anode and the cathode are electrically separated; adding an alkaline electrolyte to the housing; cycling the electrochemical cell into the $2^{nd}$ electron capacity of the manganese dioxide; forming a layered manganese dioxide having a layered manganese dioxide structure with the one or more additives incorporated into the layered manganese dioxide structure.

A twenty second embodiment can include the method of the twenty first embodiment, wherein cycling the electrochemical cell comprises cycling the electrochemical cell between −1 V vs Hg|HgO and 0.3 V vs Hg|HgO.

A twenty third embodiment can include the method of the twenty first or twenty second embodiment, further comprising: using the electrochemical cell as a battery after forming the layered manganese dioxide.

A twenty fourth embodiment can include the method of the twenty third embodiment, wherein using the electrochemical cell comprises discharging and charging the cell a plurality of times.

A twenty fifth embodiment can include the method of the twenty fourth embodiment, wherein using the electrochemical cell comprises discharging the electrochemical cell within at least a portion of the $2^{nd}$ electron capacity of the layered manganese dioxide.

A twenty sixth embodiment can include the method of any one of the twenty first to the twenty fifth embodiments, wherein the manganese dioxide compound is $\alpha$, $\beta$, $\gamma$, $\lambda$, $\varepsilon$, $\delta$, electrolytic manganese dioxide, pyrolusite, birnessite, ramsdellite, hollandite, romanechite, todorokite, lithiophorite, chalcophanite, sodium or potassium rich birnessite, cryptomelane, buserite, manganese oxide, a spinel form of manganese dioxide, a partially or fully protonated ($H^+$) structure of manganese dioxide or manganese oxide or manganese hydroxide, a hydroxide structure of manganese, a partially or fully lithiated structure of manganese dioxide, a water intercalated structure of manganese dioxide, a copper intercalated structure of manganese dioxide, a combination or an intermediate phase of manganese dioxide.

A twenty seventh embodiment can include the method of any one of the twenty first to the twenty sixth embodiments, wherein the spinel form of manganese dioxide is $Mn_3O_4$, $ZnMn_2O_4$, $LiMn_2O_4$, $AlMn_2O_4$, $CuMn_2O_4$, $HMn_2O_4$, $MgMn_2O_4$, or combinations thereof.

A twenty eighth embodiment can include the method of any one of the twenty first to twenty seventh embodiments, wherein a hydroxide structure of manganese is $\alpha,\gamma$, $\beta,\delta$-MnOOH or $Mn(OH)_2$.

A twenty ninth embodiment can include the method of any one of the twenty first to the twenty eighth embodiments, wherein the additive is in oxide or hydroxide forms, or elemental forms.

A thirtieth embodiment can include the method of any one of the twenty first to the twenty ninth embodiments, wherein the additive is bismuth oxide, bismuth hydroxide, copper oxide, copper hydroxide, cobalt hydroxide, lead oxide, silver oxide, nickel oxide, nickel hydroxide, lithium hydroxide, nickel, copper, bismuth or cobalt.

A thirty first embodiment can include the method of the twenty first or thirtieth embodiment, wherein the additive is copper and is in powder form or metallic support form.

A thirty second embodiment can include the method of any one of the twenty first to the thirty first embodiments, wherein the conductive carbon is selected from the group consisting of graphite, carbon black, acetylene black, single walled carbon nanotubes, multi-walled carbon nanotubes, graphene, graphyne, graphene oxide, and combinations thereof.

A thirty third embodiment can include the method of any one of the twenty first to the thirty second embodiments, wherein the electrode consists essentially of greater than 0 wt. % and less than or equal to 99 wt. % of the manganese dioxide; greater than 0 wt. % and less than or equal to 99 wt. % of the conductive carbon; and the balance being covered by the additive.

A thirty fourth embodiment can include the method of any one of the twenty first to the thirty third embodiments, wherein the electrode has a porosity between 5-95%.

A thirty fifth embodiment can include the method of any one of the twenty first to the thirty fourth embodiments, further comprising: removing the layered manganese dioxide from the electrochemical cell; combining the layered manganese dioxide with at least one additional component to form a cathode mixture; forming a cathode using the cathode mixture; placing the cathode in a battery; and operating a battery.

In a thirty sixth embodiment, a method of forming a cathode material comprises: combining: a manganese dioxide, one or more additives selected from the group consisting of bismuth, copper, tin, lead, silver, cobalt, nickel, magnesium, aluminum, potassium, lithium, calcium, gold, antimony, iron, and zinc; and a conductive carbon, wherein the additive is in elemental form or a salt form; and wherein the manganese dioxide has a second electron capacity; forming a cathode mixture based on the combining; cycling the cathode mixture between 0.1-100% of the second electron capacity of the manganese dioxide between limits of greater than or equal to 0.8V and less than or equal to 2.5V vs Zinc or greater than or equal to −0.4V and less than or equal to 1.1V vs Hg|HgO, greater than or equal to 0V and less than or equal to 2.5V vs Zn or greater than or equal to −1.4V and 1.1V vs Hg|HgO; and forming a layered manganese dioxide having a layered manganese dioxide structure with the one or more additives incorporated into the layered manganese dioxide structure.

A thirty seventh embodiment can include the method of the thirty sixth embodiment, further comprising: using the electrochemical cell as a battery after forming the layered manganese dioxide.

A thirty eighth embodiment can include the method of the thirty sixth or thirty seventh embodiment, wherein using the electrochemical cell comprises discharging and charging the cell a plurality of times.

A thirty ninth embodiment can include the method of the thirty eighth embodiment, wherein using the electrochemical cell comprises discharging the electrochemical cell within at least a portion of the $2^{nd}$ electron capacity of the layered manganese dioxide.

A fortieth embodiment can include the method of any one of the thirty sixth to thirty ninth embodiments, wherein the battery is a secondary battery that is galvanostatically rechargeable for at least ten cycles.

A forty first embodiment can include the method of any one of the thirty sixth to fortieth embodiments, wherein manganese dioxide has a second electron capacity and the battery is a primary battery that delivers 1-100% of the second electron capacity of manganese dioxide.

A forty second embodiment can include the method of any one of the thirty sixth to forty first embodiments, wherein manganese dioxide has a second electron capacity and the battery delivers a limited utilization of the second electron capacity for at least ten cycles.

A forty third embodiment can include the method of any one of the thirty sixth to forty second embodiments, wherein the cathode mixture is cycled within an electrochemical cell, wherein the electrichemical cell comprises an anode, an electrolyte, and a separator disposed between and electrically insulating the anode from the cathode mixture.

A forty fourth embodiment can include the method of the forty third embodiment, wherein the anode is zinc, lithium, aluminum, magnesium, iron, potassium, calcium, selenium, or nickel oxyhydroxide.

A forty fifth embodiment can include the method of the forty third embodiment, wherein the polymeric separator comprises a polymer selected from the group consisting of a cellulose film, a sintered polymer film, a hydrophilically modified polyolefin, or combinations thereof.

A forty sixth embodiment can include the method of the forty third embodiment, wherein the electrolyte is acidic, alkaline, an ionic liquid, an organic-based, solid-phase, gel or combinations thereof that conducts lithium, magnesium, aluminum, potassium, calcium or zinc ions.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s).

Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of forming a layered manganese dioxide for use in a cathode of a battery, the method comprising steps of:
    disposing a cathode into a housing of an electrochemical cell, the cathode comprising a cathode material comprising:
    a manganese dioxide compound,
    one or more additives selected from the group consisting of bismuth, copper, tin, lead, silver, cobalt, nickel, magnesium, aluminum, potassium, lithium, calcium, gold, antimony, iron, zinc, and combinations thereof, wherein the additive is in elemental form or a salt form, and
    a conductive carbon;
    disposing an anode into the housing;
    disposing a polymeric separator between the anode and the cathode such that the anode and the cathode are electrically separated;
    adding an alkaline electrolyte to the housing;
    cycling the electrochemical cell into the $2^{nd}$ electron capacity of the manganese dioxide, wherein cycling the electrochemical cell comprises cycling the electrochemical cell between −1 V vs Hg|HgO and 0.3 V vs Hg|HgO; and
    forming a layered manganese dioxide having a layered manganese dioxide structure with the one or more additives incorporated into the layered manganese dioxide structure.

2. The method of claim 1, further comprising:
    using the electrochemical cell as a battery after forming the layered manganese dioxide.

3. The method of claim 2, wherein using the electrochemical cell comprises discharging and charging the cell a plurality of times.

4. The method of claim 3, wherein using the electrochemical cell comprises discharging the electrochemical cell within at least a portion of the $2^{nd}$ electron capacity of the layered manganese dioxide.

5. The method of claim 1, wherein the manganese dioxide compound is $\alpha$, $\beta$, $\gamma$, $\lambda$, $\varepsilon$, $\delta$, electrolytic manganese dioxide, pyrolusite, birnessite, ramsdellite, hollandite, romanechite, todorokite, lithiophorite, chalcophanite, sodium or potassium rich birnessite, cryptomelane, buserite, manganese oxide, a spinel form of manganese dioxide, a partially or fully protonated (H$^+$) structure of manganese dioxide or manganese oxide or manganese hydroxide, a hydroxide structure of manganese, a partially or fully lithiated structure of manganese dioxide, a water intercalated structure of manganese dioxide, a copper intercalated structure of manganese dioxide, a combination or an intermediate phase of manganese dioxide.

6. The method of claim 1, wherein the spinel form of manganese dioxide is $Mn_3O_4$, $ZnMn_2O_4$, $LiMn_2O_4$, $AlMn_2O_4$, $CuMn_2O_4$, $HMn_2O_4$, $MgMn_2O_4$, or combinations thereof.

7. The method of claim 1, wherein the layered manganese dioxide compound is a hydroxide structure, and wherein the hydroxide structure of manganese is $\alpha,\gamma,\beta,\delta$-MnOOH or Mn(OH)$_2$.

8. The method of claim 1, wherein the one or more additives are in oxide or hydroxide forms, or elemental forms.

9. The method of claim 1, wherein the one or more additives comprise bismuth oxide, bismuth hydroxide, copper oxide, copper hydroxide, cobalt hydroxide, lead oxide, silver oxide, nickel oxide, nickel hydroxide, lithium hydroxide, nickel, copper, bismuth, cobalt, magnesium, or magnesium oxide.

10. The method of claim 1, wherein the additive is copper and is in powder form or metallic support form.

11. The method of claim 1, wherein the conductive carbon is selected from the group consisting of graphite, carbon black, acetylene black, single walled carbon nanotubes, multi-walled carbon nanotubes, graphene, graphyne, graphene oxide, and combinations thereof.

12. The method of claim 1, wherein the electrode consists essentially of greater than 0 wt. % and less than or equal to 99 wt. % of the manganese dioxide; greater than 0 wt. % and less than or equal to 99 wt. % of the conductive carbon; and the balance being covered by the additive.

13. The method of claim 1, wherein the electrode has a porosity between 5-95%.

14. The method of claim 1, further comprising:
    removing the layered manganese dioxide from the electrochemical cell;
    combining the layered manganese dioxide with at least one additional component to form a cathode mixture;
    forming a cathode using the cathode mixture;
    placing the cathode in a battery; and
    operating a battery.

15. A method of forming a cathode material, the method comprising:
    combining:
        a manganese dioxide,
        one or more additives selected from the group consisting of bismuth, copper, tin, lead, silver, cobalt, nickel, magnesium, aluminum, potassium, lithium, calcium, gold, antimony, iron, and zinc; and
        a conductive carbon, wherein the additive is in elemental form or a salt form; and wherein the manganese dioxide has a second electron capacity;
    forming a cathode mixture based on the combining;
    cycling the cathode mixture between 0.1-100% of the second electron capacity of the manganese dioxide between limits of greater than or equal to 0.8V and less than or equal to 2.5V vs Zinc or greater than or equal to −0.4V and less than or equal to 1.1V vs Hg|HgO, greater than or equal to 0V and less than or equal to 2.5V vs Zn or greater than or equal to −1.4V and 1.1V vs Hg|HgO; and forming a layered manganese dioxide having a layered manganese dioxide structure with the one or more additives incorporated into the layered manganese dioxide structure.

16. The method of claim 15, further comprising:
using the electrochemical cell as a battery after forming the layered manganese dioxide.

17. The method of claim 15, wherein using the electrochemical cell comprises discharging and charging the cell a plurality of times.

18. The method of claim 17, wherein using the electrochemical cell comprises discharging the electrochemical cell within at least a portion of the $2^{nd}$ electron capacity of the layered manganese dioxide.

19. The method of claim 15, wherein the battery is a secondary battery that is galvanostatically rechargeable for at least ten cycles.

20. The method of claim 15, wherein manganese dioxide has a second electron capacity and the battery is a primary battery that delivers 1-100% of the second electron capacity of manganese dioxide.

21. The method of claim 15, wherein manganese dioxide has a second electron capacity and the battery delivers a limited utilization of the second electron capacity for at least ten cycles.

22. The method of claim 15, wherein the cathode mixture is cycled within an electrochemical cell, wherein the electrochemical cell comprises an anode, an electrolyte, and a separator disposed between and electrically insulating the anode from the cathode mixture.

23. The method of claim 22, wherein the anode is zinc, lithium, aluminum, magnesium, iron, potassium, calcium, selenium, or nickel oxyhydroxide.

24. The method of claim 22, wherein the polymeric separator comprises a polymer selected from the group consisting of a cellulose film, a sintered polymer film, a hydrophilically modified polyolefin, or combinations thereof.

25. The method of claim 22, wherein the electrolyte is acidic, alkaline, an ionic liquid, an organic-based, solid-phase, gel or combinations thereof that conducts lithium, magnesium, aluminum, potassium, calcium or zinc ions.

* * * * *